US006872024B2

(12) United States Patent
Hsu

(10) Patent No.: US 6,872,024 B2
(45) Date of Patent: Mar. 29, 2005

(54) PIVOT SHAFT STRUCTURE FOR SCISSOR MECHANISMS

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 26 days.

(21) Appl. No.: 10/632,990

(22) Filed: Aug. 4, 2003

(65) Prior Publication Data

US 2004/0037623 A1 Feb. 26, 2004

Related U.S. Application Data

(62) Division of application No. 09/964,326, filed on Sep. 28, 2001.

(30) Foreign Application Priority Data

Sep. 29, 2000 (TW) ..................................... 89216850 U

(51) Int. Cl.[7] ................................................ B60R 22/20
(52) U.S. Cl. ....................................... 403/113; 403/116
(58) Field of Search ................................ 403/112, 113, 403/114, 115, 116

(56) References Cited

U.S. PATENT DOCUMENTS 188,186 A * 3/1877 Pullinger .................... 403/116
522,916 A 7/1894 Noble
3,782,670 A 1/1974 Kielma
3,850,047 A * 11/1974 Davis ..................... 403/116 X
4,522,528 A 6/1985 Bewers
5,037,135 A 8/1991 Kotikovsky
5,054,723 A 10/1991 Arnold
5,542,774 A * 8/1996 Hoy ........................... 403/116

* cited by examiner

*Primary Examiner*—John Cottingham
(74) *Attorney, Agent, or Firm*—Troxell Law Office PLLC

(57) ABSTRACT

A pivot shaft structure for scissor mechanisms consists of a pivot shaft and a matching receiving hole. The pivot shaft includes at least a turning contour formed by a portion of the shaft contour of a pseudo turning shaft and a constraint contour formed by removing another portion of the pseudo turning shaft. The receiving hole has an hole contour for matching the pivot shaft and includes at least a matching turning contour formed by a portion of an hole contour of a pseudo turning shaft opening and a matching constraint contour formed by filling another portion of the pseudo turning shaft opening. Through the matching between the pseudo turning shaft and the pseudo turning shaft opening, the turning contour of the pivot shaft may pivotally turn in the matching turning contour of the receiving hole, and through contact between the constraint contour of the pivot shaft and the matching constraint contour of the receiving hole to form a turning limitation for the pivot shaft in the receiving hole.

3 Claims, 4 Drawing Sheets

PIVOT SHAFT STRUCTURE FOR SCISSOR MECHANISMS

This application is a Division of currently pending application U.S. Ser. No. 09/964,326, entitled "PIVOT SHAFT STRUCTURE FOR SCISSOR MECHANISMS" and filed on Sep. 28, 2001.

BACKGROUND OF THE INVENTION (1) Field of the Invention

The present invention relates to a pivot shaft structure for scissor mechanisms and more particularly to a cam-like shaft structure for a scissor mechanism to limit the moving angle of the scissor mechanism.

(2) Description of the Prior Art

Among free elevation mechanisms, scissor mechanisms are widely used to support all kinds of loading, whether light or heavy loads. For instance, they can be used in heavy-duty applications such as uplift elevators, cranes and the like. The light-duty applications can be seen in keyswitchs for notebook computers, scissor extension mechanisms and the like. FIG. 1 illustrates a scissor mechanism 12 adapted for a keyswitch 1 of a notebook computer keyboard. The scissor mechanism 12 has a dual-linkage structure located between a key cap 11 of the keyswitch 1 and the base plate 10 of the keyboard. In the actual embodiments implemented in the notebook computers, an elastic rubber dome 13 for providing resilience force to the keyswitch is disposed between the key cap 11 and base plate 11, and the keyswitch is also disposed between the two dual linkages.

As shown in FIG. 1, the scissor mechanism 12 has two bars 121*a*, 121*b* located at either side. The two bars 121*a*, 121*b* are crossed at a middle portion and engaged by a pivot shaft structure 120. Referring to FIG. 2, the pivot shaft structure 120 consists of a round shaft 122 located on one bar 121*b* and a mating round aperture 123 formed at another bar 121*a*. The round shaft 122 is rotatable in the round aperture 123 thereby to allow the two bars 121*a*, 121*b* of the scissor mechanism 12 to perform lifting and lowering operations.

In the conventional scissor mechanism 12 with dual symmetric linkage bars (especially those of smaller sizes), the linkage bars at two sides are moving synchronously. In order to make production easier and to coordinate the movements, the bars 121*a*, 121*b* of the two linkage bars are usually integrally made and formed. The integral form may be a rectangular frame or an U-shape. For instance, in the scissor mechanism 12 shown in FIG. 1, two pairs of corresponding bars 121*a*, 121*b* are respectively formed in a rectangular frame and an U-shape (shown by broken lines for the portions hidden below the key cap 11).

In the conventional scissor mechanism 12, the round shaft 122 may turn freely in the round aperture 123. Hence, it takes great care to install the scissor mechanism 12 on the applied device (there are four installation points located up and down at one side of the scissor mechanism 12). It is important in the art that special attention is required to install the scissor mechanism 12 at the correct direction, for installing the scissor mechanism 12 at the wrong position will affect subsequent assembly and operations. The concern of installation direction is particularly obvious and keen for the smaller size scissor mechanisms used in the keyboards.

One of the shortcomings of the scissor mechanism 12 that the two bars 121*a*, 121*b* have to be assembled in advance. As the round shaft 122 may turn freely in the round aperture 123, under certain circumstances it could happen that the round shaft 122 supposed to be assembled and installed for turning purpose will be mistakenly installed as a slide shaft (for instance, being mounted at the locations on the base plate 10 for supporting the two bars 121*a*, 121*b*). Namely, the two bars 121*a*, 121*b* are turned mistakenly for 180 degrees before the scissor mechanism 12 is installed. As a result, the subsequent assembly work and operations will have serious problems. This type of problems cannot be totally avoided even for the integrally formed bars 121*a*, 121*b* (as shown in FIG. 1), because to recognize the correct direction for the rectangular frame is difficult.

Taking the keyboards of notebook computers for example, when the scissor mechanism 12 is installed at the wrong direction, the keyswitchs of the mistaken keyboard will have an abnormal height and their depressing operation will also be affected. Hence, in the industry, in order to achieve correct installation, the correct direction will be usually labeled or marked on the scissor mechanism. Whereas, for the scissor mechanisms of smaller size, the space and size for attaching the labels or marks is limited. Even with the labels or marks attached, their sizes will be definite too small to be recognized. Moreover, because the scissor mechanisms used in the notebook computers are tiny, errors of installation direction are usually difficult to be aware from their appearances. Hence, to distinguish the correct installation direction becomes a process bottleneck in the installation of the scissor mechanism.

The limited sizes of width and thickness of the bars 121*a*, 121*b* is another drawback of the conventional scissor mechanism 12. The round aperture 123 formed in the bar 121*a* will result in a very thin structure for the bar 121*a* around the round aperture 123 and thus severely weakens the structural strength of the bars 121*a*, 121*b*.

SUMMARY OF THE INVENTION

The primary object of the present invention is to provide a pivot shaft structure for scissor mechanisms that has a cam-like pivot shaft structure to restrict the moving angle of the scissor mechanisms, so that the installation direction of the scissor mechanisms can be recognized clearly.

Another object of the present invention is to provide a pivot shaft structure for scissor mechanisms in which the pivot aperture is so deigned that the bars have a greater thickness thereof to increase the structural strength effectively.

According to the present invention, the scissor mechanism includes two bars engaged in a cross manner through the pivot shaft structure. The pivot shaft structure consists of a pivot shaft and a receiving hole.

The pivot shaft is vertically mounted to a bar in a protrusive manner, and includes at least a turning contour and at least a constraint contour. The turning contour is a portion of an shaft contour of a pseudo turning shaft and has a scope exceeding a semicircular portion of the pseudo turning shaft. The constraint contour is the contour formed by removing another portion of the pseudo turning shaft. Each constraint contour forms a turning central angle relative to the pseudo turning shaft.

The receiving hole is located on another bar and has an hole contour to match the pivot shaft. The receiving hole further includes at least a matching turning contour and at least a matching constraint contour. The matching turning contour is a portion of an hole contour of a pseudo turning shaft opening and has a scope exceeding a semicircular portion of the pseudo turning shaft opening. The matching constraint contour is the contour formed after filling another portion of the pseudo turning shaft opening. Each matching constraint contour forms a matching turning central angle relative to the pseudo turning shaft opening.

In the present invention, the pseudo turning shaft and the pseudo turning shaft opening are coupled for turning and have a common turning axis. Each matching turning central angle is smaller than the corresponding turning central angle. Thereby, the pivot shaft is restricted to turn in the receiving hole within a limited range. The pivot shaft structure of the present invention is turned through coupling the turning contour with the corresponding matching turning contour, and through contact between the constraint contour and the corresponding matching constraint contour to form the turning limitation for the pivot structure. The smallest absolute variation angle between the matching turning central angle and the corresponding turning central angle is the changeable turning angle of the scissor mechanism, i.e. the turning limitation range.

In one aspect of the present invention, the reason for having the occupied scope of the turning contour exceed the semicircular scope of the pseudo turning shaft contour is to prevent the pivot shaft from vibrating in the receiving hole. The variation angle of the changeable turning angle for the scissor mechanism is preferably between 15 degrees and 165 degrees.

According to one embodiment of the present invention, the constraint contour may be formed by removing flatly another portion of the pseudo turning shaft. By the same token, the matching constraint contour may be formed by filling flatly another portion of the pseudo turning shaft opening.

According to one embodiment of the present invention, the pivot shaft may have two turning contours which are symmetrical about a diameter of the pseudo turning shaft. Similarly, the receiving hole may also have two matching turning contours and which also are symmetrical about a diameter of the pseudo turning shaft opening.

According to another embodiment of the present invention, the pivot shaft may be extended to form a dual-section structure. One of the sections may be used to form the turning contour, and another section may be used to form the constraint contour. In this embodiment, the receiving hole shall also have a dual-section to match the pivot shaft.

According to a further embodiment of the present invention, the keyswitch assembly comprises: (a) a key cap having a lower surface provided with first guiding parts, (b) a base plate having an upper surface disposed below the key cap and provided with second guiding parts positioned to correspond to the first guiding parts; and (c) a key support coupled to the first guiding parts and the second guiding parts for supporting the key cap performing vertical movement with respect to the base plate. The key support further comprises: (c1) a first bar; (c2) a second bar pivotally engaged with the first bar; (c3) a receiving hole formed on the first bar; (c4) a protrusion formed within the receiving hole; and (c5) a pivot shaft formed on the second bar. The pivot shaft has a slot formed thereon, and the slot is dimensioned to make the protrusion slidably received within the slot. When the pivot shaft is inserted into the receiving hole, the protrusion is slidably received within the slot. The first bar can perform a rotation relative to the second bar, and the rotation is less than a predetermined angle limited by the engagement of the protrusion and the slot.

Preferably, the predetermined angle of the present invention is ranged from 15 degrees to 165 degrees. Also, the slot of the pivot shaft is preferably formed by removing a portion of said pivot shaft.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
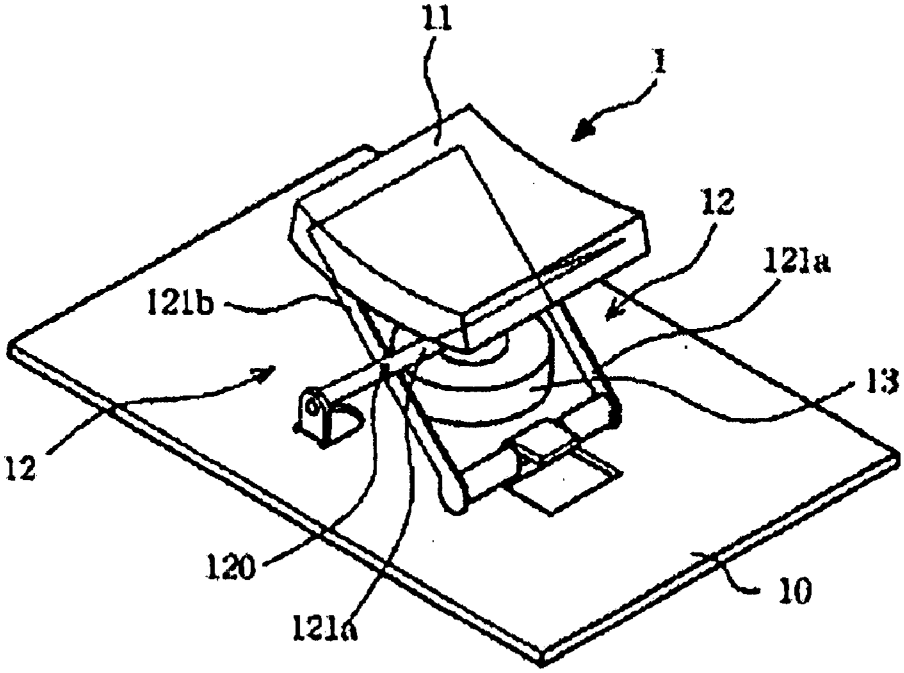
Fig. 1 (Prior Art)
FIG. 1 is a perspective schematic view of a conventional scissor mechanism adapted for notebook computers.

In the following descriptions, like reference characters and numerals designate similar parts throughout the various views to facilitate explanation.

Figure 2:
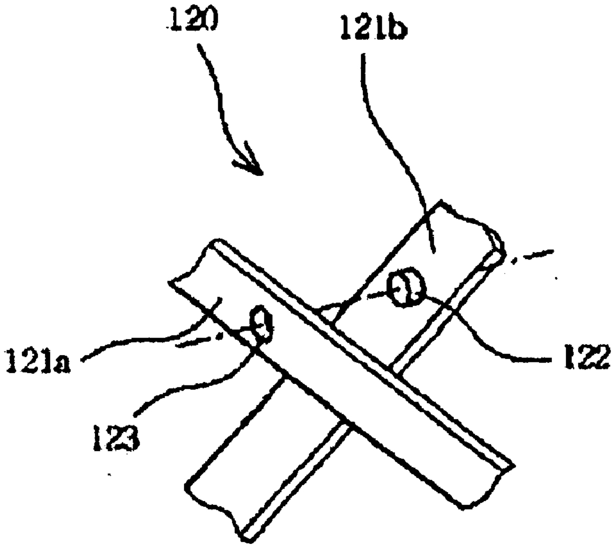
Fig. 2 (Prior Art)
FIG. 2 is a fragmentary exploded view of a pivot shaft structure of the conventional scissor mechanism according to FIG. 1.

The scissor mechanism 12 according to the present invention, like the conventional structure shown in FIGS. 1 and 2, consists of two crossed and pivotal bars 121*a*, 121*b* engaged through a pivot shaft structure 120. Each of the bars 121*a*, 121*b* has ends mounting to the engaged elements. Through the pivotal turning function provided by the pivot shaft structure 120, the engage elements attached to the scissor mechanism 12 may be extended apart or compressed closely toward each other.

Figure 3:
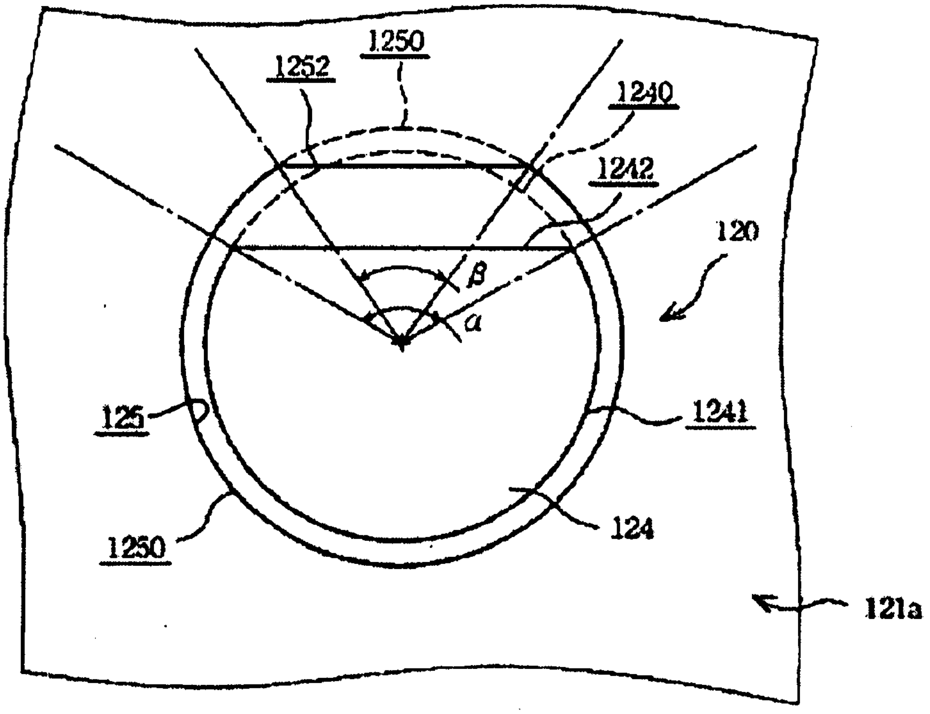
FIG. 3 is a schematic first sectional view of a pivot shaft structure for scissor mechanisms of the present invention.

Referring to FIG. 3 for a first embodiment of the present invention, the pivot shaft structure 120 consists of a pivot shaft 124 vertically mounted to a bar in a protrusive manner, and a receiving hole 125 located on another bar for housing the pivot shaft 124 and thus allowing the pivot shaft 124 to turn in the interior space thereof.

The pivot shaft 124 includes a turning contour 1241 and a constraint contour 1242. The turning contour 1241 is a portion of the shaft contour of a pseudo turning shaft 1240 exceeding a semicircular section of the shaft contour. The constraint contour 1242 is a contour formed by removing another portion of the pseudo turning shaft 1240. The constraint contour 1242 forms a turning central angle $\alpha$ at the cross section of the pseudo turning shaft 1240.

The receiving hole 125 provides an hole contour to allow the pivot shaft 124 to turn therein and also to constrain the turning thereof. The hole contour further includes a matching turning contour 1251 and a matching constraint contour 1252. The matching turning contour 1251 is a portion of an hole contour of a pseudo turning shaft opening 1250 exceeding a semicircular section of the hole contour. The matching constraint contour 1252 is a contour formed by filling another portion of the pseudo turning shaft opening 1250. The matching constraint, contour 1252 forms a matching turning central angle $\beta$ at the cross section of the pseudo turning shaft opening 1250.

In the present invention, the pseudo turning shaft 1240 and pseudo turning shaft opening 1250 form a matching turning shaft and opening, and have a common turning axis. Thereby, the pivot shaft structure 120 may achieve a matched turning effect through coupling the turning contour 1241 with the matching turning contour 1251. When the constraint contour 1242 and the matching constraint contour 1252 turn to a selected position and hit each other, it forms the turning limitation for the pivot shaft structure 120.

As shown in the drawing, in this embodiment the matching turning central angle β is smaller than the turning central angle α. The variation angle (α-β) of those two angles is the changeable turning angle of the scissor mechanism. Namely, the pivot shaft 124 may be turned in the receiving hole 125 within the limitation range defined by the variation angle (α-β). In the present invention, the variation angle (α-β) may be ranged from 0 to 180 degrees. When it is 0 degree, it means that the pivot shaft structure 120 is totally not turnable and becomes a fixed structure. When the variation angle is 180 degrees, the pivot shaft 124 may be turned freely in the receiving hole 125 and there is no turning limitation. In the present invention, it is preferably to set the variation angle (α-β) between 15 degrees and 165 degrees to make the two bars of the scissor mechanism turnable between 15 degrees and 165 degrees.

In the present invention, the reason of setting the turning contour 1241 exceeding the semicircular section of the shaft contour of the pseudo turning shaft 1240 is to prevent the pivot shaft 124 from having structural deficiency and thus to result in the pseudo turning shaft 1240 having no turning limitation in the pseudo turning shaft opening 1250. It also can prevent the pivot shaft 124 from wobbling in the receiving hole 125.

As shown in the drawing, the constraint contour 1242 may be formed by flatly removing a portion of the contour of the pseudo turning shaft 1240. Similarly, the matching constraint contour 1251 may be formed by filling flatly another portion of the contour of the pseudo turning shaft opening 1250. Of course, the removing and filling processes may be done in a nonlinear fashion. The main design factor is to form a resistant type limitation outside the selected turning range of the pivot shaft structure 120.

Figure 4A:
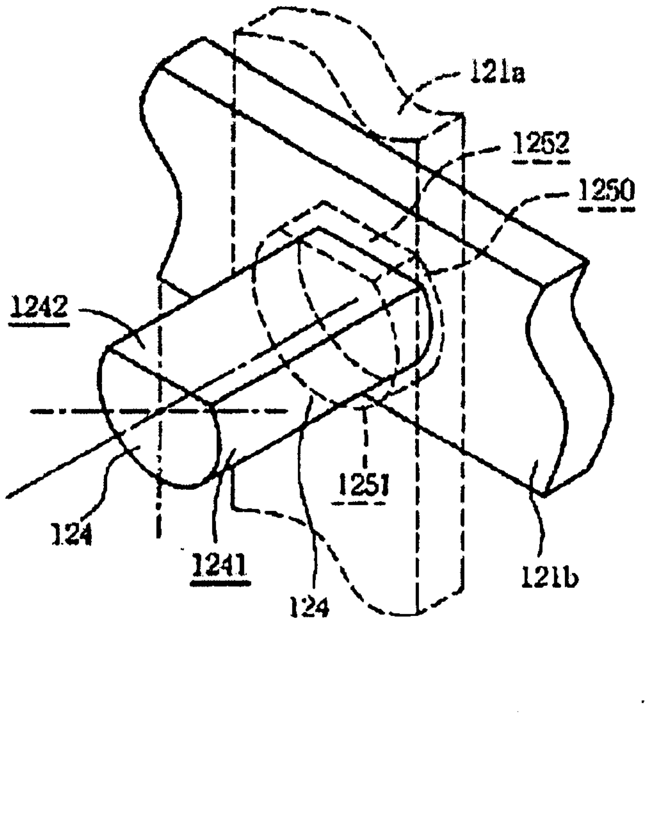
FIG. 4A is a fragmentary exploded view of a first embodiment of the pivot shaft according to FIG. 3.

FIG. 4A depicts a first embodiment of the pivot shaft shown in FIG. 3. The constraint contour 1242 and turning contour 1241 are on the same cross section of the pivot shaft 124. The receiving hole 125 is formed to house the pivot shaft 124.

Figure 4B:
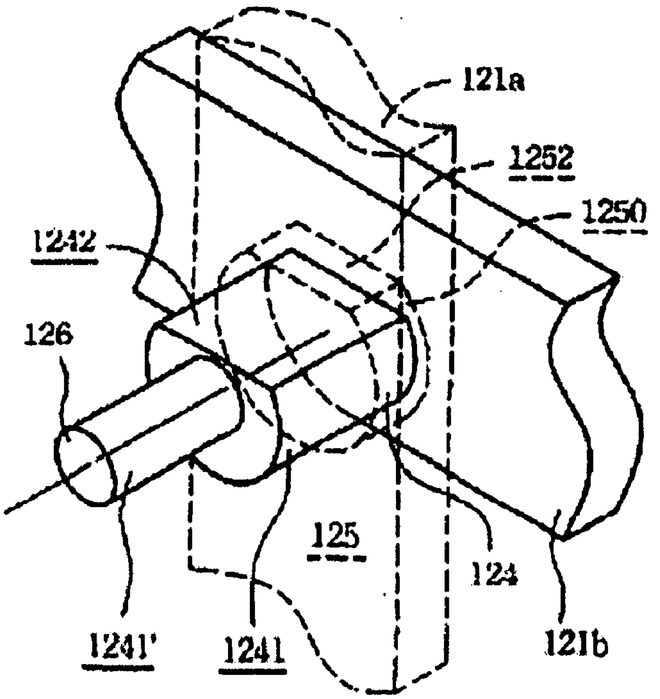
FIG. 4B is a fragmentary exploded view of a second embodiment of the pivot shaft according to FIG. 3.

FIG. 4B depicts a second embodiment of the pivot shaft shown in FIG. 3. The pivot shaft 124 has a dual-section structure. There is a front section 126 to perform turning function for the pivot shaft 124. Namely, the turning contour 1241' is formed on the front section 126. Another section is to perform the function of turning limitation for constraint contour 1242. In fact, in this embodiment, the turning contour 1241' of the front section 126 performs the function of the turning contour 1241 shown in FIG. 4A. Technically, it is an alternative element quipped with same effect and is within the technical scope of the present invention. The receiving hole 125 also is a dual-section form to match the pivot shaft 124. Details of such a construction are known in the art and are omitted here.

The embodiment shown in FIG. 4B also has advantages in assembly. During assembling, the front section 126 of the pivot shaft 124 may serve as a guide for the installation of the rear section. This is very important for assembling the bars 121 in the small size scissor mechanisms 12.

In the structure shown in FIG. 4B, the front section 126 of the pivot shaft 124 may also be dedicated for guiding the assembly of the bars 121*a*, 121*b*, and with the turning and limitation function of the pivot shaft 124 taken over by the turning contour 1241 and constraint contour 1242 located at the rear section of the pivot shaft 124.

Figure 5:
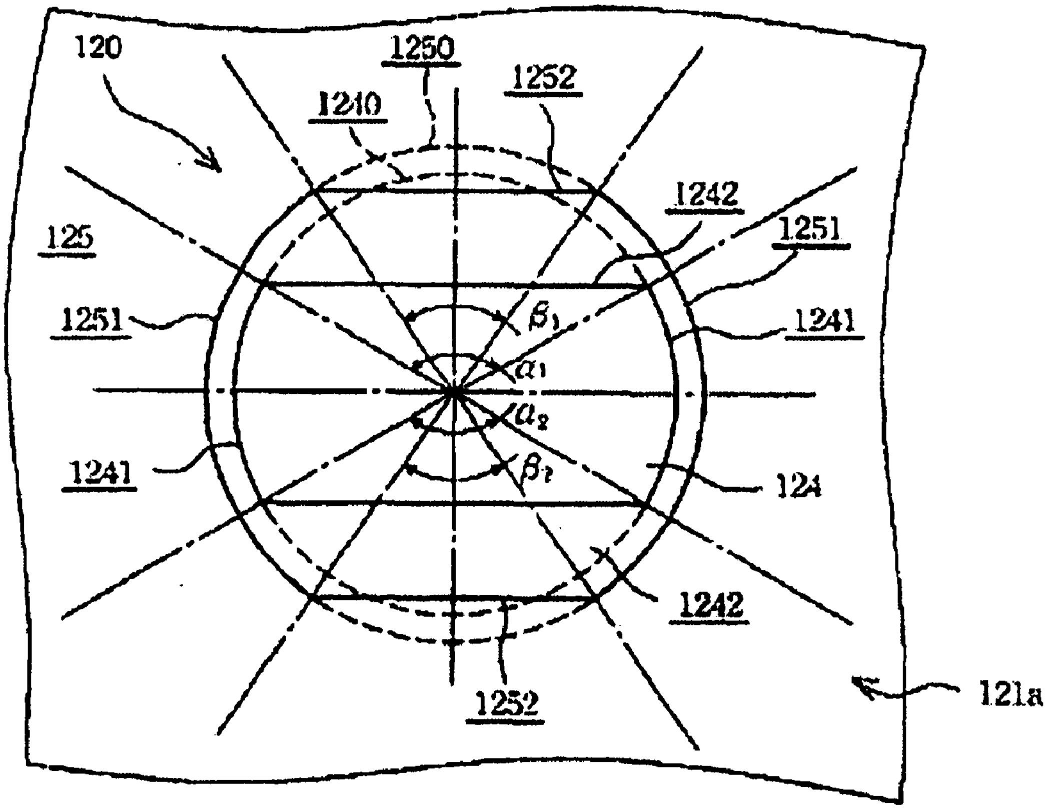
FIG. 5 is a schematic second sectional view of a pivot shaft structure for scissor mechanisms of the present invention.

Referring to FIG. 5 for a second embodiment of the present invention, the pivot shaft 124 has two turning contours 1241 (it is noted that the two turning contours 1241 have respectively a transverse range exceeding the semicircular range of a pseudo turning shaft 1240) and two constraint contours 1242. The two turning contours 1241 and two constraint contours 1242 are preferably symmetrical about a diameter of the pseudo turning shaft 1240. By the same token, the receiving hole 125 may also have two matching turning contours 1251 and two matching constraint contours 1252 which are preferably symmetrical about a diameter of the pseudo turning shaft opening 1250.

As shown in the drawing, in this embodiment each of the matching turning central angle β1 and β2 is smaller than the corresponding turning central angle α1 and α2, the smaller absolute variation angle of (α1-β1) and (α2-β2) is the changeable turning angle of the scissor mechanism. Namely, the pivot shaft 124 may be turned in the receiving hole 125 within the range defined by the smallest absolute variation angle.

Of course, in the aforesaid embodiments, the pivot shaft 124 may have a plurality of numbers or sections for the turning contours 1241 and constraint contours 1242. This is the extension of the second embodiment set forth above and may be adapted by those skilled in the art. Details will be omitted here.

Figure 6:
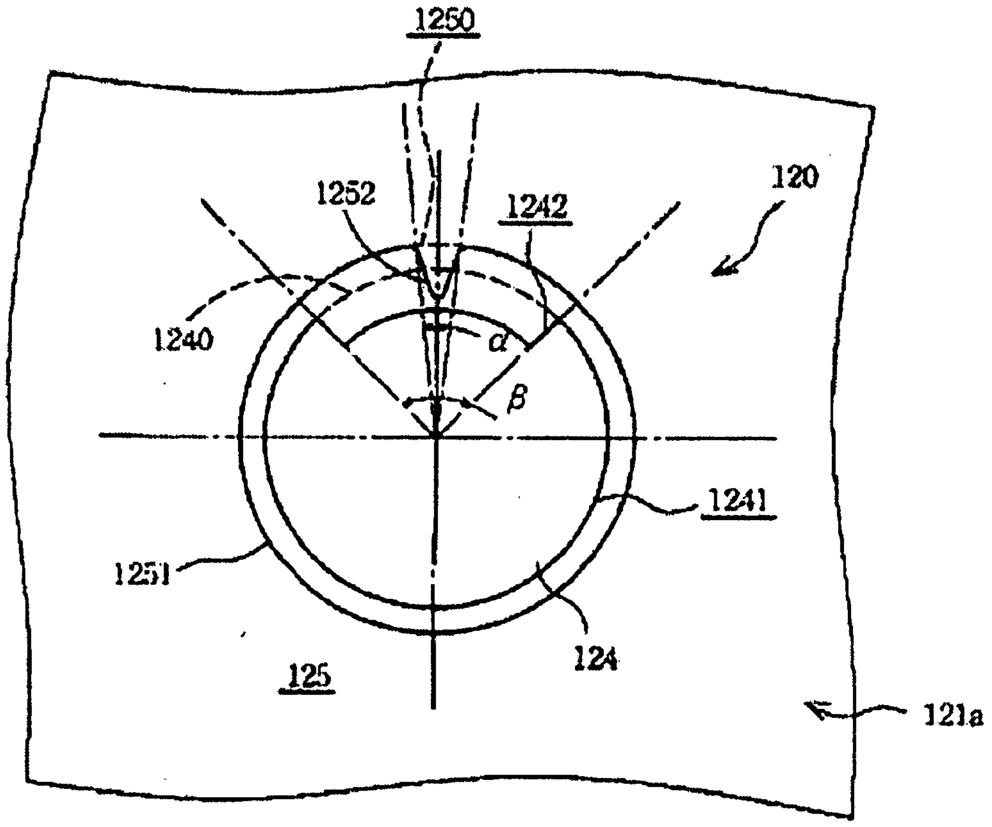
FIG. 6 is a schematic third sectional view of a pivot shaft structure for scissor mechanisms of the present invention.

Referring to FIG. 6 for a third embodiment of the present invention, the constraint contour 1242 on the pivot shaft 124 is an indented recess. In contrast, the receiving hole 125 has a protrusive matching constraint contour 1252 corresponding to the indented recess. As shown in the drawing, the matching constraint contour 1252 is contained in the scope of the constraint contour 1242. The size of the turning central angle β of the constraint contour 1242 on the pseudo turning shaft 1240 matches the matching turning central angle α of the matching constraint contour 1252 in the pseudo turning shaft opening 1250. The allowing turning angle for the pivot shaft structure 120 is (β-α).

Of course, in this embodiment, the pivot shaft 124 may have a plurality numbers or sections for the turning contours 1241 and constraint contours 1242. This is the extension of the foregoing embodiments and may be adapted by those skilled in the art. Details will be omitted here.

In the present invention, through matching the pseudo turning shaft 1240 with the pseudo turning shaft opening 1250, the turning contour 1241 of the pivot shaft 124 may be pivotally turned in the matching turning contour 1251 of the receiving hole 125. Through the constraint contours 1242 of the pivot shaft 124 hitting the matching constraint contour 1252 of the receiving hole 125, a turning limitation may be formed in the receiving hole 125 for the pivot shaft 124.

Equally as described and shown in previous paragraphs and figures, the keyswitch assembly of the present invention comprises: (a) a key cap 11 having a lower surface provided with first guiding parts, (b) a base plate 10 having an upper surface disposed below the key cap 11 and provided with second guiding parts positioned to correspond to the first guiding parts; and (c) a key support (the pair of the pivot shaft structure 120, i.e. the scissor mechanism) coupled to the first guiding parts and the second guiding parts for supporting the key cap 11 performing vertical movement with respect to the base plate 10. Further, the key support comprises: (c1) a first bar 121; (c2) a second bar 121 pivotally engaged with the first bar 121; (c3) a receiving hole 125 formed on the first bar 121; (c4) a protrusion 1252 formed within the receiving hole 125; and (c5) a pivot shaft 124 formed on the second bar 121. The pivot shaft 124 has a slot (the area enclosed by 1240 and 1242) formed thereon, and the slot is dimensioned to make the protrusion 1252 slidably received within the slot. When the pivot shaft 1252 is inserted into the receiving hole 125, the protrusion 1252 is slidably received within the slot. The first bar 121 can perform a rotation relative to the second bar 121, and the rotation is less than a predetermined angle limited by the engagement of the protrusion 1252 and the slot.

Preferably, the predetermined angle of the present invention is ranged from 15 degrees to 165 degrees. Also, the slot of the present invention is preferably formed by removing a portion of the pivot shaft 124.

In the present invention, the cam-like structure of the pivot shaft not only can restrict the moving angle of the scissor mechanism. It also provides a directional characteristics for installation of the scissor mechanisms and may prevent the scissor mechanisms from installing at the wrong directions, and makes recognizing the correct installation direction easier.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

What is claimed is:

1. A keyswitch assembly comprising:

a) a key cap having a lower surface provided with first guiding parts;

b) a base plate having an upper surface located below the key cap and having second guiding parts positioned to correspond to the first guiding parts; and c) a key support coupled to the first guiding parts and the second guiding parts for supporting the key cap for vertical movement with respect to the base plate, the key support comprising:

i) a first bar;

ii) a second bar pivotally engaged with the first bar;

iii) a receiving hole formed in the first bar;

iv) a protrusion formed within the receiving hole; and v) a pivot shaft formed on the second bar, the pivot shaft having a slot formed thereon, slidably receiving the protrusion;

wherein when the pivot shaft is inserted into the receiving hole, the protrusion is slidably received within the slot, so that the first bar is able to rotate relative to the second bar a predetermined angle limited by engagement of the protrusion and the slot.

2. The keyswitch assembly of claim 1, wherein said predetermined angle is ranged from 15 degrees to 165 degrees.

3. The keyswitch assembly of claim 1, wherein said slot is formed by removing a portion of said pivot shaft.

* * * * *